(12) United States Patent
Horikawa (10) Patent No.: US 8,495,652 B2
(45) Date of Patent: Jul. 23, 2013

(54) IT SYSTEM BEHAVIOR MEASUREMENT AND ANALYSIS SYSTEM AND METHOD THEREOF

(75) Inventor: Takashi Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 305 days.

(21) Appl. No.: 12/918,870

(22) PCT Filed: Dec. 25, 2008

(86) PCT No.: PCT/JP2008/073589
§ 371 (c)(1),
(2), (4) Date: Aug. 23, 2010

(87) PCT Pub. No.: WO2009/104344
PCT Pub. Date: Aug. 27, 2009

(65) Prior Publication Data
US 2011/0004443 A1    Jan. 6, 2011

(30) Foreign Application Priority Data

Feb. 22, 2008   (JP) ................................. 2008-040977

(51) Int. Cl.
*G06F 9/46* (2006.01)

(52) U.S. Cl.
USPC ............................ 718/108; 718/102; 718/107

(58) Field of Classification Search
None
See application file for complete search history.

(56) References Cited

U.S. PATENT DOCUMENTS

| | | | |
|---|---|---|---|
| 2003/0093792 A1* | 5/2003 | Labeeb et al. ................... | 725/46 |
| 2005/0021708 A1* | 1/2005 | Raghuraman et al. ......... | 709/223 |
| 2005/0167486 A1* | 8/2005 | Horikawa et al. .............. | 235/380 |
| 2005/0193277 A1* | 9/2005 | Horikawa et al. ................ | 714/45 |
| 2006/0190596 A1* | 8/2006 | Horikawa ....................... | 709/224 |

FOREIGN PATENT DOCUMENTS

| | | |
|---|---|---|
| JP | 60-11948 A | 1/1985 |
| JP | 3-46040 A | 2/1991 |
| JP | 4-76640 A | 3/1992 |
| JP | 5-346861 A | 12/1993 |
| JP | 8-314767 A | 11/1996 |
| JP | 9-179754 A | 7/1997 |
| JP | 9-212373 A | 8/1997 |
| JP | 2006277115 A | 10/2006 |

OTHER PUBLICATIONS

International Search Report for PCT/JP2008/073589 mailed Mar. 10, 2009.

* cited by examiner

*Primary Examiner* — Emerson Puente
*Assistant Examiner* — Dong Kim (57) ABSTRACT

When a process sleep event, a process wake-up event, a process save event, and a process resume event occur in an IT system having a multiprocessor configuration, a tracer respectively generates sleep event data, wake-up event data, save event data, and resume event data and records them as trace data in a trace buffer. The analysis unit generates an analysis result by referring to the trace data to accumulate a number of times of execution of the process wake-up process and a first time as a time from the process save event to the process wake-up event or to the process resume event with respect to a plurality of processes to be executed. When a contention for a shared resource occurs, the process wake-up process is repeatedly executed among relevant processes. For this reason, based on the analysis result, a possibility can be presented that the shared resource contention occurs in the IT system.

15 Claims, 6 Drawing Sheets

| EVENT OCCURRENCE TIME | CPU | PROCESS | EVENT | OPERATING OBJECT |
|---|---|---|---|---|
| TIME01 | CPU2 | PROCESS b | SAVE | |
| TIME02 | CPU2 | PROCESS b | SLEEP | |
| TIME03 | CPU3 | PROCESS c | SAVE | |
| TIME04 | CPU3 | PROCESS c | SLEEP | |
| TIME05 | CPU1 | PROCESS a | WAKE-UP | PROCESS b |
| TIME06 | CPU2 | PROCESS b | RESUME | |
| TIME07 | CPU1 | PROCESS a | SAVE | |
| TIME08 | CPU1 | PROCESS a | SLEEP | |
| TIME09 | CPU2 | PROCESS b | WAKE-UP | PROCESS c |
| TIME10 | CPU3 | PROCESS c | RESUME | |
| TIME11 | CPU3 | PROCESS c | WAKE-UP | PROCESS a |
| TIME12 | CPU1 | PROCESS a | RESUME | |
| TIME13 | CPU2 | PROCESS b | SAVE | |
| TIME14 | CPU2 | PROCESS b | SLEEP | |
| TIME15 | CPU3 | PROCESS c | SAVE | |
| TIME16 | CPU3 | PROCESS c | SLEEP | | ary

IT SYSTEM BEHAVIOR MEASUREMENT AND ANALYSIS SYSTEM AND METHOD THEREOF

This application is the National Phase of PCT/JP2008/073589, filed Dec. 25, 2008, which is based upon and claims the benefit of priority from Japanese Patent Application No. 2008-040977, filed on Feb. 22, 2008, the disclosure of which is incorporated herein its entirely by reference.

TECHNICAL FIELD

The present invention relates to an IT (Information Technology) system behavior measurement and analysis system, and a method thereof.

BACKGROUND ART

Recent improvement in performance of an IT system largely depends on mounting of multiple processors on one system (multiprocessor configuration), rather than improvement in performance of one processor. Such a multiprocessor system simultaneously executes a plurality of processes with a plurality of processors. On the basis of this, improvement in performance as a system is intended. However, in the multiprocessor system, the plurality of processes executed by the plurality of processors may require the use of a shared resource at the same time. That is, contention for the shared resource (hereinafter also referred to as shared resource contention) may occur. When the shared resource contention occurs, improvement in performance corresponding to the number of processors may not be achieved. For this reason, behavior of the IT system is measured and analyzed when the IT system execute a program. It is checked whether or not the shared resource contention occurs, and when the contention occurs, it is further checked which part the resource contention occurs in. To check them is an important key to the improvement in performance of the IT system.

Methods for measuring behavior of a computer are roughly classified into an event driven method and a sampling method. In the event driven method, an event (process switching, start and end of an I/O process, communication, or the like), which occurs in a measuring object computer executing a program, is used as a trigger to execute a measurement operation. As one type of the event driven method, there is a method referred to as an event trace method. In the event trace method, information about an occurred event is recorded as time-series data (trace data), and a final analysis result is obtained by analyzing the information later.

Between the event trace method and an event driven method other than the event trace method, there are large differences in measurement data amount, applicable algorithm type, whether or not various algorithms are repeatedly applicable; however, it may be thought that a mechanism to obtain an analysis result is the same in both of the methods. That is, the both methods are common to each other in that events occurring in a measuring object system and algorithms defining analysis processes corresponding to the events are applied to the measuring object system. The difference is in timing to apply the algorithm (whether the algorithm is applied to trace data obtained as a result of measurement or the algorithm is applied while executing measurement). For this reason, in the following, the event trace method is taken up to be described.

In the event trace method, in order to obtain a meaningful result from trace data as a measurement result, there is required an algorithm that processes the trace data. As such algorithm, various algorithms are prepared depending on an object of an analysis; however, an algorithm that executes an analysis on the shard resource contention has not been present so far.

On the other hand, in the sampling method, a state of a measuring object system is checked at a constant time interval, and the states are summarized along time course to thereby check behavior of the system from a global viewpoint. This method is suitable for the purpose of understanding an outline of system operation over a long period of time, but not suitable for the purpose of measuring and analyzing microscopic operation such as the shared resource contention.

As described above, in the conventional technique, there has been no means for measuring and analyzing behavior with respect to the shared resource contention in an IT system having a multiprocessor configuration.

Techniques related to monitoring, check and analysis are introduced below.

Japanese patent publication (JP-A-Showa 60-11948) describes a task state transition monitoring device. The task state transition monitoring device includes a real time parallel processing unit and a data display processing unit. The real time parallel processing unit includes a management unit having functions to output a task identification code, a cause of task state transition and a time of the task state transition of a task defined in a real time parallel processing program. The data display processing unit inputs the information outputted from the management unit, converts the task identification code into a user registration task name, and causes a data display unit to display the user registration task name, a time of execution of the parallel processing program, a task state correlating the user registration task name to the time of execution of the parallel processing program, and the cause of the task state transition.

Japanese patent publication (JP-A-Heisei 5-346861) describes a multitasking software inspection device. The multitasking software inspection device inspects switching control operation in which a multi-task program having a plurality of tasks is executed in parallel by using a scheduler. The inspection device includes a detection unit, a storage unit, an inspection unit, and an output unit. The detection unit detects a switching due to a switching control of the scheduler. The storage unit stores switching data detected by the detection unit. The inspection unit inspects whether the executed operation of the multi-task program satisfies a specification or not by comparing and collating the switching data stored in the storage unit with inputted specification data about the switching control. The output unit outputs a detection result of the detection unit and an inspection result of the inspection unit.

Japanese patent publication (JP-A-Heisei 4-76640) describes a system for analyzing task break time during online operation. In the task break time analysis system, a temporal break of task processing in a running state is executed by an interruption by time slice/memory hold or the like; a transition of the task to a ready state is executed after the completion of the interruption process; and a recovery to the running state is executed by a task dispatcher. The task break time analysis system includes: a state flag indicating whether or not on-line processing performance is being measured; a calculation unit holding a task ID of a measuring object; and first, second, and third information collection process routines. When an interruption occurs during running of an on-line task, in a case that the interruption is an interruption for the measuring object task, an interruption analysis routine activates an interruption execution routine after setting the task ID, starting a timer for displaying elapsed time after the interruption, and activating the first information collection process routine to collect information such as the task ID, a time of occurrence of the interruption, and an interruption cause type such as the time slice/memory hold, whereas in other cases, the interruption analysis routine directly activates the interruption execution routine. In a case that a task ID of a source of occurrence of the interruption is set and a value of the above timer exceeds a predetermined value at a completion of a predetermined interruption process, the interruption execution routine activates the second information collection process routing to collect the task ID, a current time, and the like, and then passes control to the task dispatcher, whereas in other cases, the interruption execution routine directly passes the control to the task dispatcher. The task dispatcher checks, at a batch moment to a task, whether or not an ID of dispatch destination task and the task ID of the interruption occurrence source coincide with each other. In a case that those coincide with each other, when the value of the timer exceeds the predetermined value, the task dispatcher performs dispatch as usual after calling the third information collection process routine to collect an execution priority of the dispatch destination task, task ID, the current time, and the like, initializing the set task ID of the interruption occurrence source, and stopping the above timer, whereas in the other cases, the task dispatcher simply performs dispatch as usual.

DISCLOSURE OF THE INVENTION

As described above, there has been no means for measuring and analyzing behavior with respect to the shared resource contention in an IT system having a multiprocessor configuration. Therefore, an object of the present invention is to provide a behavior measurement and analysis system that can present a possibility of occurrence of contention for shared resource in an IT system.

An IT system behavior measurement and analysis system of the present invention includes an event tracer, a trace buffer, an analysis unit, and an output unit. When a process sleep event, a process wake-up event, a process save event, and a process resume event occur in an IT system having a multiprocessor configuration, the tracer respectively generates sleep event data, wake-up event data, save event data, and resume event data. Each of the sleep event data, the wake-up event data, the save event data and the resume event data includes information indicating a type of an event and an event occurrence time of occurrence of the event. The sleep event data, the wake-up event data, the save event data and the resume event data respectively include pieces of information indicating a process sleep process, a process wake-up process, a process save process, and a process resume process for bringing a process into sleep, wake-up, save, and resume. The trace buffer records data including the sleep event data, the wake-up event data, the save event data, and the resume event data as trace data. The analysis unit refers to trace data to accumulate, based on the process save process, the process wake-up process that wakes up a process saved by the process save process, and the event occurrence time, a number of times of execution of the process wake-up process and a first time as a time from the process save event to the process wake-up event or to the process resume event with respect to a plurality of processes to be executed. The output unit outputs a first result including the number of times and the first time. The process wake-up process may use a shared resource at the same time, and is caused by a shared resource contention. For this reason, based on the first analysis result, a possibility can be presented that the shared resource contention occurs in the IT system having a multiprocessor configuration.

BRIEF DESCRIPTION OF DRAWINGS

The above and other objects, advantages, and features of the invention will be more apparent from description of embodiments in conjunction with the accompanying drawings in which.

BEST MODE FOR CARRYING OUT THE INVENTION

Referring to the accompanying drawings, an IT system behavior measurement and analysis system according to embodiments of the present invention is described below in detail.

Figure 1:
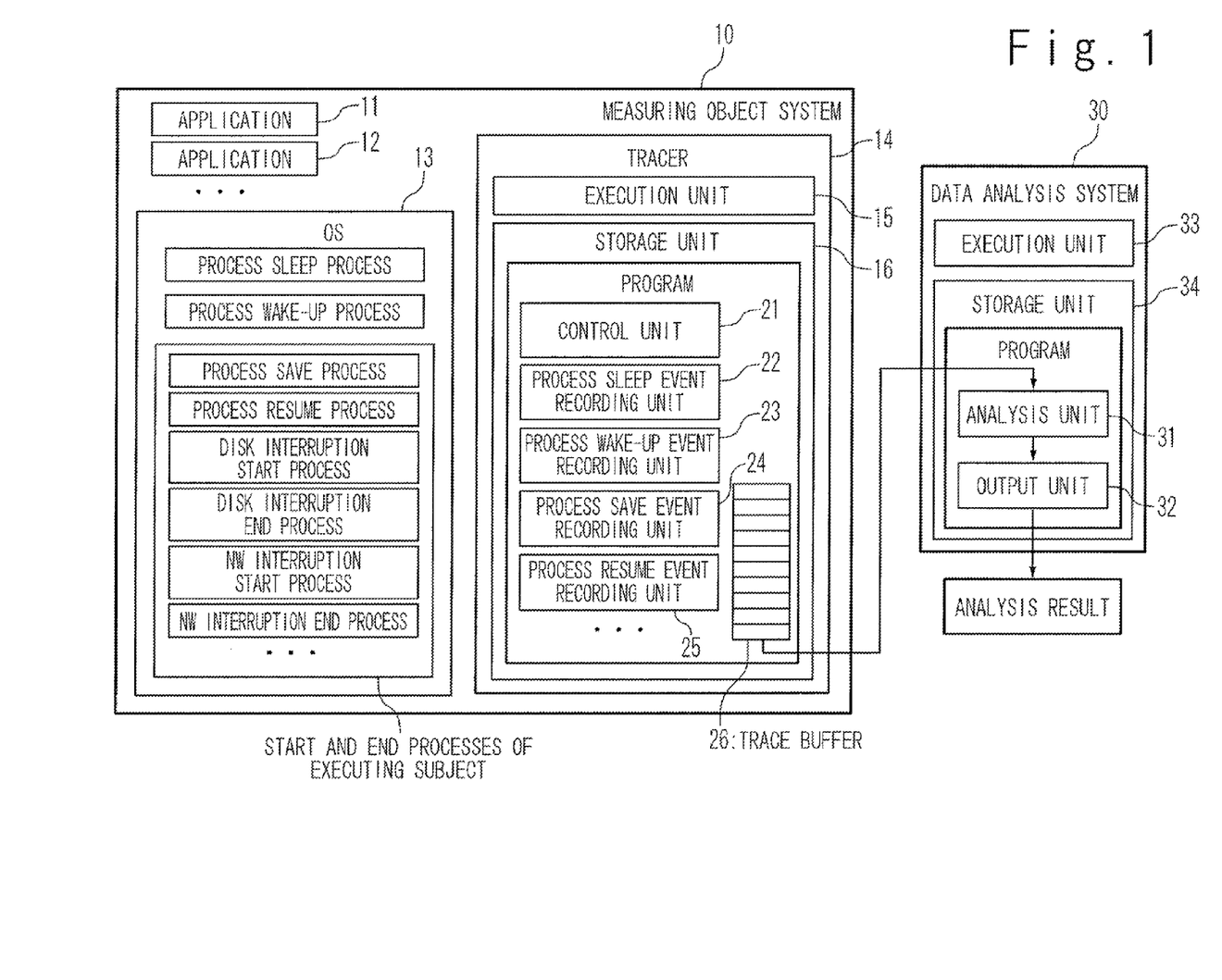
FIG. 1 is a block diagram illustrating a configuration of an IT system behavior measurement and analysis system according to an embodiment of the present invention.

FIG. 1 illustrates a configuration of an IT system behavior measurement and analysis system according to an embodiment of the present invention. The behavior measurement and analysis system is a computer that measures and analyzes behavior of an IT (Information Technology) system having a multiprocessor configuration, and includes a measuring object system 10 and a data analysis system 30.

The measuring object system 10 is connected to the IT system to monitor the IT system. The measuring object system 10 includes application programs 11 and 12, an operating system (OS) 13, and an event tracer 14 (hereinafter referred to as a tracer 14).

The tracer 14 includes a storage unit 16 as a recording medium that stores a computer program and an execution unit 15 that executes the computer program. The execution unit 15 reads the above computer program from the storage unit 16 to execute it at an activation of the computer (measuring object system 10) or the like. The computer program includes a control unit 21, a process sleep event recording unit 22, a process wake-up event recording unit 23, a process save event recording unit 24, a process resume event recording unit 25, and a trace buffer 26. The control unit 21 controls on and off of a trace collection operation. The process sleep event recording unit 22, the process wake-up event recording unit 23, the process save event recording unit 24, and the process resume event recording unit 25 respectively record a process sleep event, a process wake-up event, a process save event, and a process resume event in the trace buffer 26.

The measuring object system 10 executes the application programs 11 and 12 under the management of the OS 13, similarly to an ordinary computer. At this time, an operator uses the control unit 21 in the tracer 14 to set the trace operation to on-state. At this time, along with the execution of the above programs, a process sleep process, a process wake-up process, a process save process, and a process resume process in the OS 13 are executed. The process sleep event recording unit 22, the process wake-up event recording unit 23, the process save event recording unit 24, and the process resume event recording unit 25 in the tracer 14, which respectively correspond to the above processes, are activated. The process sleep process, the process wake-up process, the process save process, and the process resume process respectively represent processes for bringing a process into sleep, wake-up, save, and resume.

It is provided that the process sleep event, the process wake-up event, the process save event, and the process resume event occur in the IT system. In this case, the tracer 14 executes a measurement process described below.

In the measurement process, the process sleep event recording unit 22, the process wake-up event recording unit 23, the process save event recording unit 24, and the process resume event recording unit 25 respectively generate sleep event data, wake-up event data, save event data, and resume event data to record them in the trace buffer 26. Here, each of the sleep event data, the wake-up event data, the save event data and the resume event data includes information indicating a type of a corresponding event and a time of occurrence of the corresponding event (event occurrence time). The sleep event data, the wake-up event data, the save event data and the resume event data respectively include pieces of information indicating executing subjects of the process sleep process, the process wake-up process, the process save process and the process resume process. The wake-up event data further includes information indicating a wake-up object process serving as a wake-up object.

As a result, in the trace buffer 26, the plurality of pieces of event data (sleep event data, wake-up event data, save event data, and resume event data) are sequentially recorded as pieces of trace data from first data to last data in accordance with the event occurrence times. The collection of the pieces of trace data is completed when the operator uses the control unit 21 in the tracer 14 to set the trace operation to off-state.

The data analysis system 30 is connected to the measuring object system 10. The data analysis system 30 includes a storage unit 34 as a recording medium that stores a computer program and an execution unit 33 that executes the computer program. The execution unit 33 reads the above computer program from the storage unit 34 to execute it at an activation of the computer (data analysis system 30) or the like. The computer program includes an analysis unit 31 and an output unit 32.

When the collection of the pieces of trace data is completed, the analysis unit 31 performs an analysis process described below.

In the analysis process, the analysis unit 31 refers to or reads the pieces of trace data recorded in the trace buffer 26. At this time, based on the process save process, the process wake-up process that wakes up a process saved by the process save process, and the event occurrence time, the analysis unit 31 accumulates a number of times of execution of the process wake-up process, and a time from the process save event to the process wake-up event or to the process resume event (hereinafter also referred to as a time zone, a time accumulation total, or a first time) with respect to a plurality of processes to be executed. The analysis unit 31 generates an analysis result (hereinafter also referred to as a first analysis result) including the above number of times and the above first time, and the output unit 32 outputs the first analysis result.

Also, in the analysis process, when referring to or reading the pieces of trace data, based on the process sleep process, the process wake-up process that wakes up a process brought into the sleep state by the process sleep process, and the event occurrence time, the analysis unit 31 accumulates the number of times of execution of the process wake-up process, and a time from the process sleep event to the process wake-up event or to the process resume event (hereinafter also referred to as a time zone, a time accumulation total, or a second time) with respect to the plurality of processes to be executed. The analysis unit 31 generates an analysis result (hereinafter also referred to as a second analysis result) including the above number of times and the above second time, and the output unit 32 outputs the second analysis result.

As described above, the IT system behavior measurement and analysis system according to the embodiment of the present invention generates and outputs the above-described analysis results. When a contention for a shared resource occurs, the process wake-up process is repeatedly executed among relevant processes. For this reason, based on the analysis results, a possibility can be presented that the shared resource contention occurs in the IT system having a multi-processor configuration.

Figure 2:
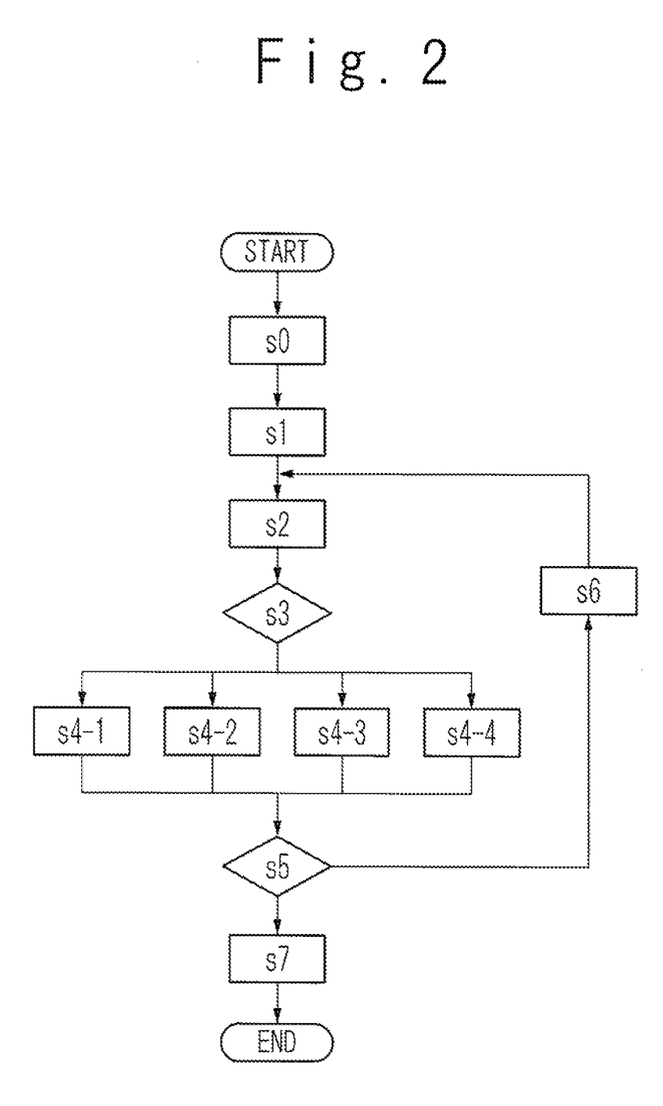
FIG. 2 is a flowchart illustrating operation of the IT system behavior measurement and analysis system according to the embodiment of the present invention.

FIG. 2 is a flowchart illustrating operation of the IT system behavior measurement and analysis system according to the embodiment of the present invention.

First, the measuring object system 10 executes the above-described measurement process (Step s0).

Then, the data analysis system 30 executes the above-described analysis process. Here, a flow of the analysis process is briefly described. First, a data reading position is set to a top of the pieces of trace data (Step s1). Then, event data for a single event is read from the data reading position (Step s2). Subsequently, based on information included the event data, the type of the event is judged (Step s3). When the type is the process sleep event as a result of the judgment, a process of the process sleep event is executed (Step s4-1). When the type is the process save event as a result of the judgment, a process of the process save event is executed (Step s9-2). When the type is the process wake-up event as a result of the judgment, a process of the process wake-up event is executed (Step s4-3). When the type is the process resume event as a result of the judgment, a process of the process resume event is executed (Step s4-4). After that, it is checked whether or not the data reading position is a tail of the pieces of trace data, i.e., whether or not the pieces of trace data have been processed to the end (Step s5). When some pieces of trace data to be processed remain, the data reading position is moved to the next event data (Step s6) to continue the analysis. In Step s5, when it is determined that the pieces of trace data have been processed to the end, analysis results obtained by the process are passed to the output unit 32 (Step s7) to complete the analysis process.

SPECIFIC EXAMPLES

Next, specific examples are used to describe the operation of the IT system behavior measurement and analysis system according to the embodiment of the present invention.

Figure 3:
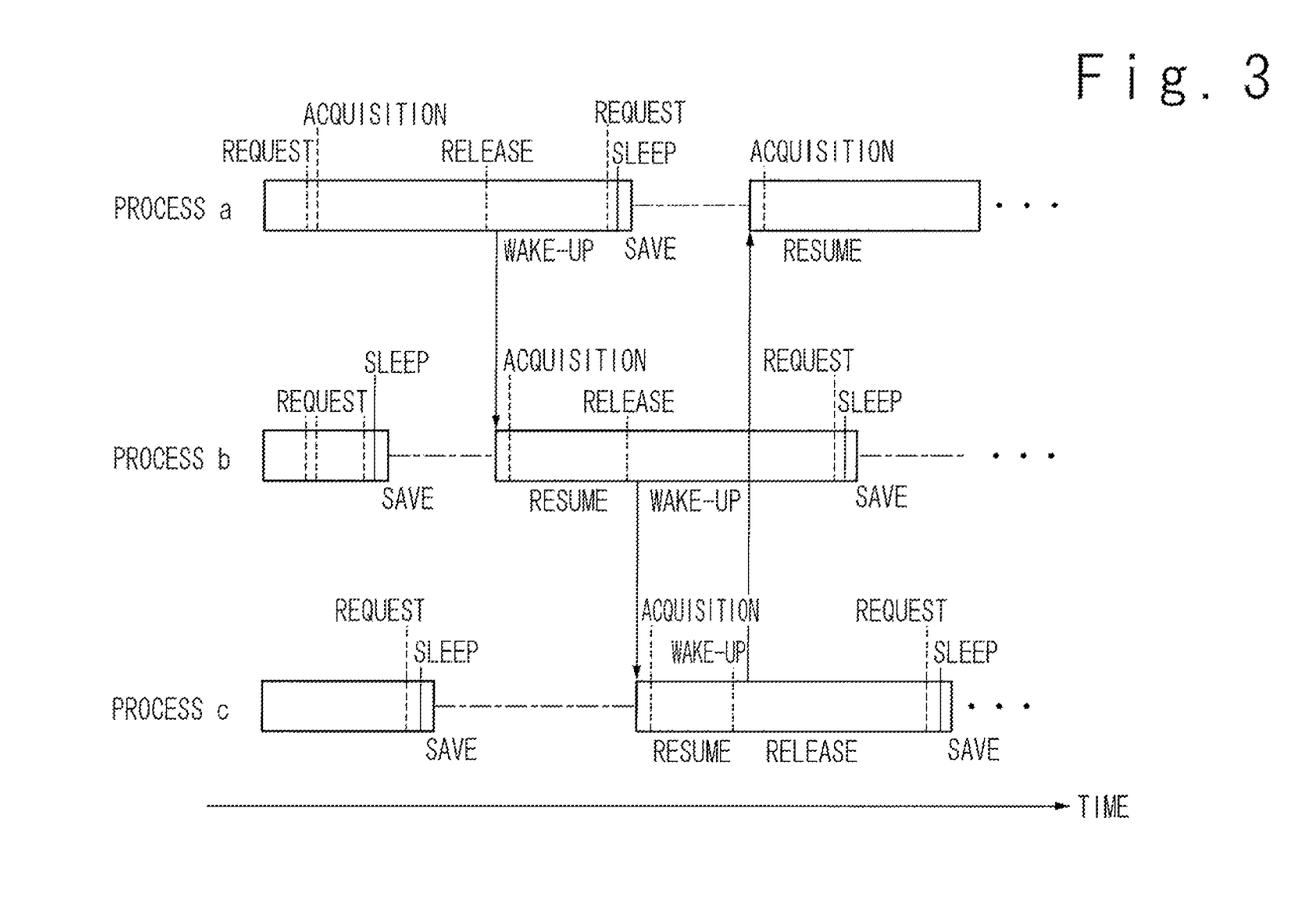
FIG. 3 is a timing chart for specifically describing that when a contention for a shared resource occurs, a process wake-up process is repeatedly executed.

First, FIG. 3 is used to specifically describe that when a contention for a shared resource occurs, the process wake-up process is repeatedly executed.

There is provided a situation that processes a, b, and c respectively use CPUs 1, 2, and 3 to proceed with the processes with being in contention with one another for one shared resource. In the figure, "SLEEP" represents the process sleep event. "WAKE-UP" represents the process wake-up event. "SAVE" represents the process save event. "RESUME" represents the process resume event. "REQUEST" represents a request for the use of the shared resource. "ACQUISITION" represents an acquisition (start of the use) of the shared resource. "RELEASE" represents a release (end of the use) of the shared resource.

First, after the process a starts using the shared resource, the processes b and c respectively request for the use of the shared resource. In this case, the requests for the use of the shared resource by the processes b and c are not accepted because the process a already uses the shared resource. As a result, the processes b and c execute the process sleep process, and then save the execution. Subsequently, when the process a finishes the use of the shared resource, one of the processes in the sleep state (in the example, the process b) is selected to execute the process wake-up process. As a result, the process b resumes the execution, and uses the shared resource to execute the process. Then, the process a makes a request for the use of the shared resource; however, at this time, the process b uses the shared resource, and therefore the process a executes the process sleep process and then saves the execution. Subsequently, when the process b finishes the use of the shared resource, one of the processes in the sleep state (in the example, the process c) is selected to execute the process wake-up process. When the process c finishes the use of the shared resource, the process a is woken up. As described above, when the contention for the shared resource occurs, the process wake-up process is repeatedly executed among the relevant processes.

Next, FIGS. 2, and 4 to 7 are used to describe the operation (analysis process) of the analysis unit 31 of the data analysis system 30 in detail.

Figure 4:
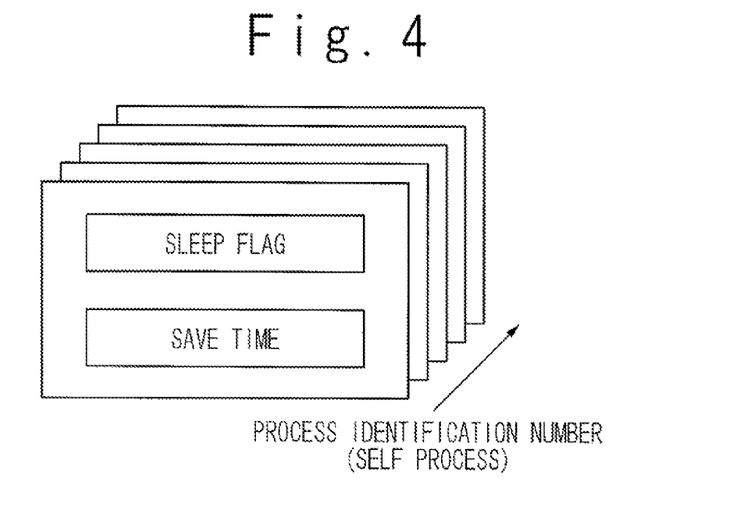
FIG. 4 is a diagram illustrating a structure of intermediate data used by an analysis unit 31 of a data analysis system 30.
Figure 5:
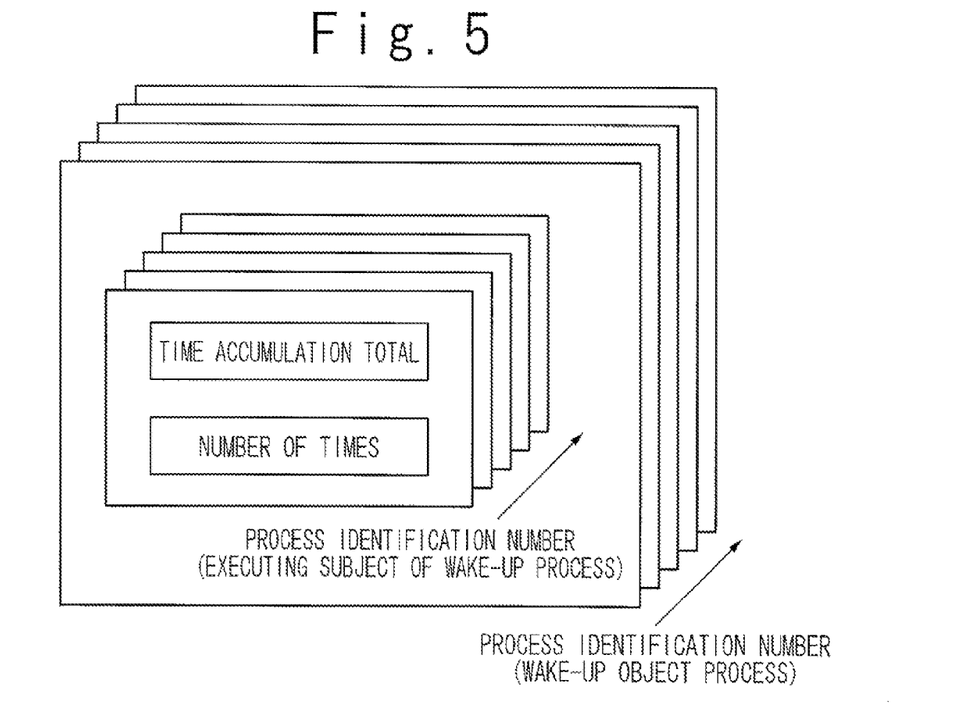
FIG. 5 is a diagram illustrating a structure of result data outputted by the analysis unit 31 of the data analysis system 30.

In the analysis process, the storage unit of the data analysis system 30 includes, in addition to a recording area that stores the computer program, storage areas for storing intermediate data, which are respectively prepared for the process for work use, and a storage area which stores result data that is referred to by a pair of the sleep and wake-up processes to store an analysis result. FIG. 4 shows a structure of the intermediate data used by the analysis unit 31, and FIG. 5 shows a structure of the result data outputted by the analysis unit 31. In FIG. 4 or 5, a plurality of data elements (intermediate data or result data) are arranged with a process identification number serving as an axis. The arrangement represents an associative array with the process identification number serving as a key. In FIG. 5, each element of an associative array with a wake-up object process serving as a key includes an associative array with a executing subject of the process wake-up process serving as a key. The intermediate data includes: a save time recording area for recording save time as event occurrence time when the process save event (process save process) saves a process; and a sleep flag that is set to true or false. The result data includes: a number-of-times recording area for recording the number of times, and a time accumulation total recording area for recording the time accumulation total (time zone). Hereinafter, for example, a field x (sleep flag, save time recording area) of the intermediate data prepared for the process a is denoted by "intermediate data [a].x", and a filed y (time accumulation total recording area, number-of-times recording area) of the result data for the case in which the sleep process is the process a and the wake-up process is the process b is denoted by "result data [a] [b].y".

The above notation is used to describe the processes executed in Steps s4-1 to s4-4 of FIG. 2, i.e., operations on the intermediate data (hereinafter, work data) and the result data, below.

In the process sleep event (Step s4-1), work data [self process].sleep flag is set to true.

In the process save event (Step s4-2), current time (event occurrence time recorded in event data, this is applied in the following cases) is set in work data [self process] .save time recording area.

In the process wake-up event (Step s4-3), when a executing subject of the process wake-up process is a process and work data [wake-up object process].sleep flag is true, the following is executed. A result obtained by subtracting the time recorded in work data [wake-up object process] .save time recording area from the current time is added to the time accumulation total recorded in result data [wake-up object process] [self process].time accumulation total recording area. Also, one is added to the number of times recorded in result data [wake-up object process] [self process].number-of-times recording area.

In the process resume event (Step s4-4), work data [self process].sleep flag is set to false.

Figure 6:
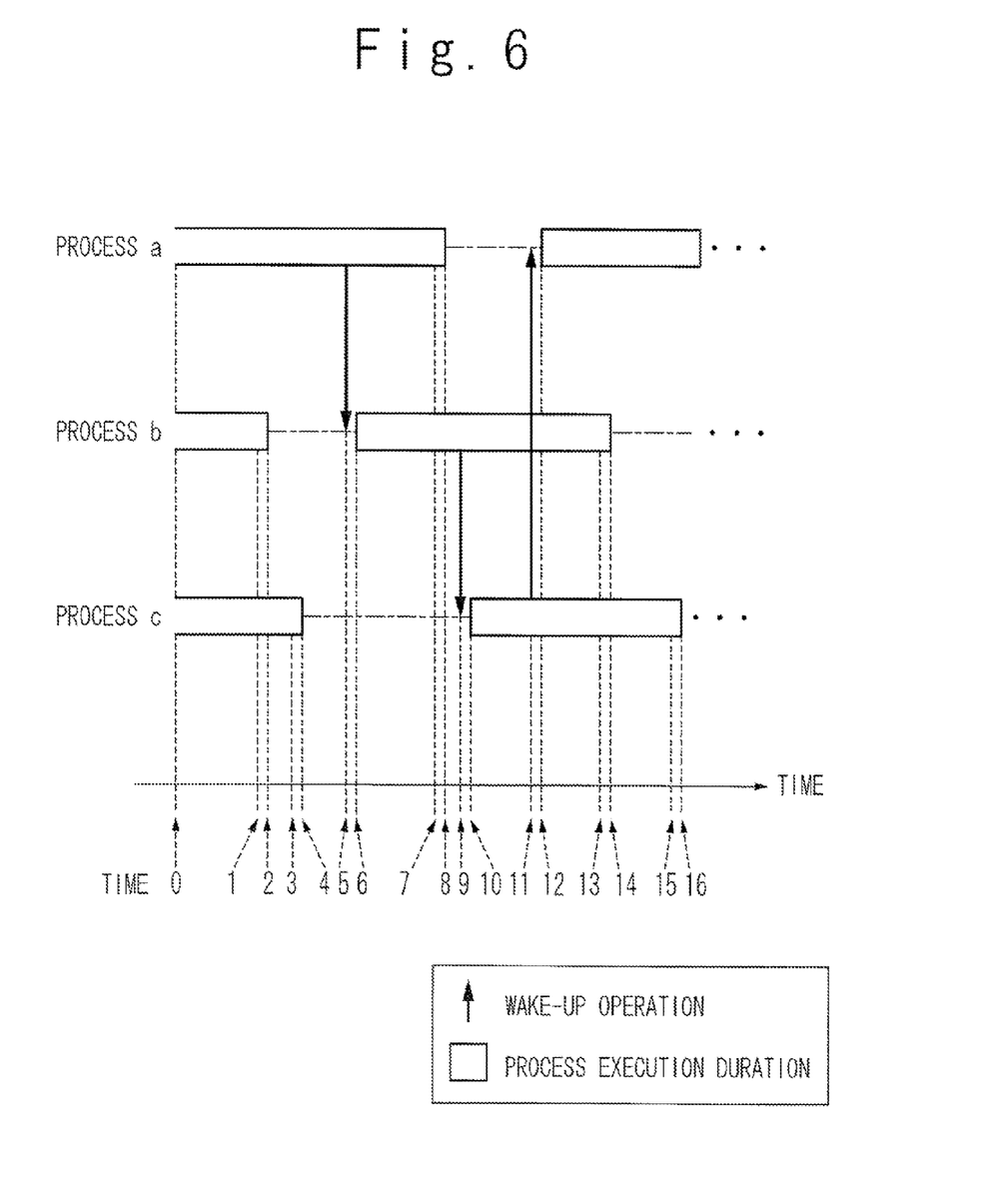
FIG. 6 is a timing chart illustrating operation of a measuring object system 10 with focusing only on measuring object events.
Figure 7:
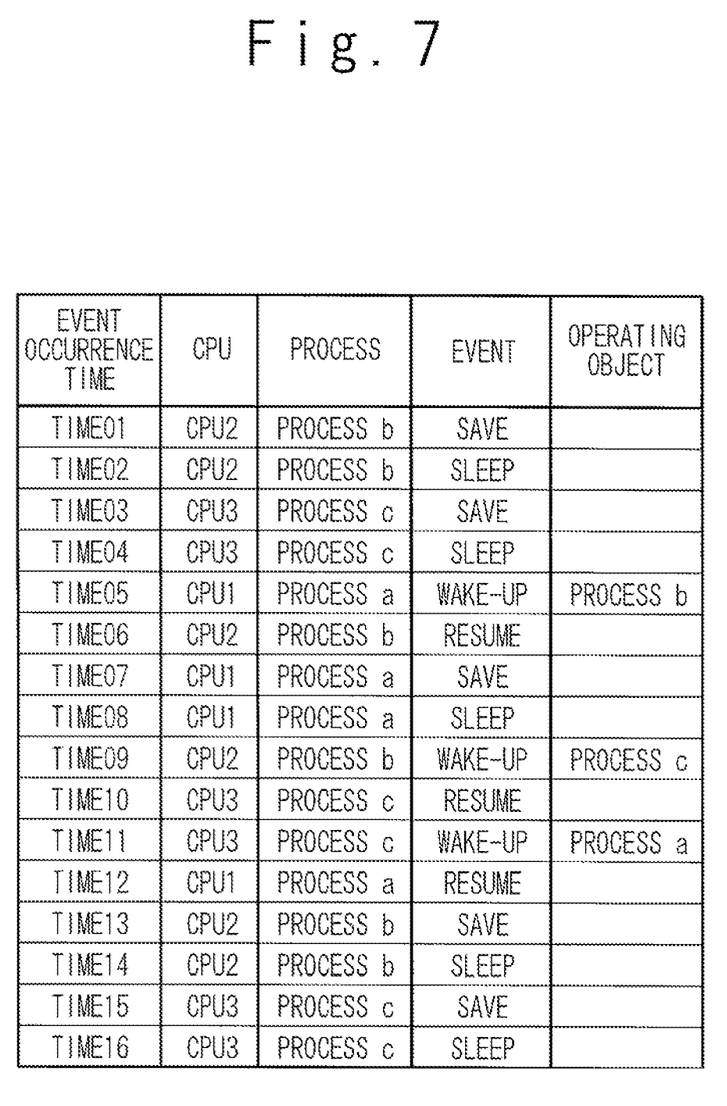
FIG. 7 shows trace data collected from the measuring object system 10 as a dump presentation.

FIG. 6 is a timing chart illustrating the operation (operation of the measuring object system 10) shown in FIG. 3 with focusing only on the process sleep event, the process wake-up event, the process save event, and the process resume event serving as measuring object events. FIG. 7 shows the trace data collected from the measuring object system 10 as a dump presentation. When the trace data are inputted into the analysis unit 31 implemented with the above Steps s4-1 to s4-4, the following results are obtained.

The time accumulation total (time zone) recorded in result data [a][c].time accumulation total recording area=time "12"−time "8", The number of times recorded in result data [a][c].number-of-times recording area=1

The time accumulation total (time zone) recorded in result data [b][a].time accumulation total recording area=time "6"−time "2", The number of times recorded in result data [a][c].number-of-times recording area=1

The time accumulation total (time zone) recorded in result data [c][b].time accumulation total recording area=time "10"−time "4", The number of times recorded in result data [a][c].number-of-times recording area=1

From the results, it is found that the process a wakes up the process b, the process b wakes up the process c, and the process c wakes up the process a, and therefore the output unit 32 outputs a result indicating a high possibility of the occurrence of the shared resource contention among the processes a, b, and c.

Next, advantages of the IT system behavior measurement and analysis system according to the embodiment of the present invention are described.

When the process sleep event, the process wake-up event, the process save event, and the process resume event occur in the IT system, the tracer 14 respectively generates the sleep event data, the wake-up event data, the save event data, and the resume event data, and records these pieces of event data as the trace data in the trace buffer 26. Each of the sleep event data, the wake-up event data, the save event data and the resume event data includes information indicating the type of a corresponding event and an event occurrence time of occurrence of the corresponding event. The sleep event data, the wake-up event data, the save event data and the resume event data respectively include pieces of information indicating executing subjects which execute the process sleep process, the process wake-up process, the process save process and the process resume process for bringing the processes into sleep, wake-up, save and resume. Here, the wake-up event data further includes information indicating a wake-up object process serving as a wake-up object. The analysis unit 31 refers to or inputs the pieces of trace data. At this time, based on the process save process, the process wake-up process that wakes up a process saved by the process save process, and the event occurrence time, the analysis unit 31 accumulates a number of times of execution of the process wake-up process, and a time from the process save event to the process wake-up event or to the process resume event (hereinafter also referred to as a time zone, a time accumulation total, or a first time) with respect to a plurality of processes to be executed. The analysis unit 31 generates an analysis result (first analysis result) including the above number of times and the above first time, and the first analysis result is outputted from the output unit 32. As described above, the IT system behavior measurement and analysis system according to the embodiment of the present invention generates and outputs the above-described first analysis result. When a contention for a shared resource occurs, the process wake-up process is repeatedly executed among relevant processes. For this reason, based on the first analysis result, the possibility can be presented that the shared resource contention occurs in the IT system having a multiprocessor configuration.

Also, when referring to or inputting the pieces of trace data, based on the process sleep process, the process wake-up process that wakes up a process brought into the sleep state by the process sleep process, and the event occurrence time, the analysis unit 31 accumulates the number of times of execution of the process wake-up process, and a time from the process sleep event to the process wake-up event or to the process resume event (a time zone, a time accumulation total, or a second time) with respect to the plurality of processes to be executed. The analysis unit 31 generates an analysis result (a second analysis result) including the above number of times and the above second time, and the second analysis result is outputted from the output unit 32. Also in this case, the IT system behavior measurement and analysis system according to the embodiment of the present invention generates and outputs the above-described second analysis result. When a contention for a shared resource occurs, the process wake-up process is repeatedly executed among relevant processes. For this reason, based on the second analysis result, the possibility can be presented that the shared resource contention occurs in the IT system having a multiprocessor configuration.

Although the present embodiment uses the tracer 14 of which processing object event include the process sleep event, the present invention is not limited to this. As another embodiment, there can also be used a tracer 14 that outputs event data including as information to be collected in the process save event, information indicating a state of a process to be saved, i.e., information indicating whether the process to be saved is in the sleep state (referred to as process state information). That is, when process state information included in a process save event indicates a sleep state, the process save event is interpreted as the sequential occurrence of the process sleep event and the process save event at the same time, and the algorithm illustrated in FIG. 2 is applied.

Although the present invention has been described above in conjunction with several exemplary embodiments thereof, the present invention is not limited to the above exemplary embodiments. Various modifications which are understandable by those skilled in the art within the scope of the present invention can be applied to the configurations and details of the present invention.

This application is based upon and claims the benefit of priority from Japanese Patent Application No. 2008-040977, filed on Feb. 22, 2008, the disclosure of which is incorporated herein its entirely by reference.

The invention claimed is:

1. An Information Technology (IT) system behavior measurement and analysis system intended for use in an IT system having a multiprocessor configuration, comprising:
   an event tracer, a trace buffer, an analysis unit, and an output unit;
   said event tracer being configured to generate event data when an event occurs, including:
      sleep event data, when said event is a process sleep event,
      wake-up event data, when said event is a wake-up event,
      save event data, when said event is a save event, and
      resume event data, when said event is a resume event;
   wherein said generated event data includes information indicating an event type of said event, an indicator of a process involved in said event, and an event occurrence time of said event;
   wherein said process indicated in said generated event data is:
      for said sleep event data, a process sleep process,
      for said wake-up event data, a process wake-up process,
      for said save event data, a process save process, and
      for said resume event data, a process resume process;
   said trace buffer being configured to record, as trace data, said generated event data;
   said analysis unit being configured to accumulate a number of times of execution of said process wake-up process based on:
      a given process save process indicated in said trace data,
      one or more instances of said process wake-up process related to the given process save process by way of said indicator, and
      said event occurrence time;
   said analysis unit being further configured to determine a first time, said first time being determined as one of:
      a time difference between (1) said event occurrence time of said process save event for said given process save process and (2) said event occurrence time of a related instance of said process wake-up event, and
      a time difference between (1) said event occurrence time of said process save event for said given process save process and (2) said event occurrence time of a related instance of said process resume event;
   wherein said analysis unit determines said first time with respect to a plurality of processes to be executed such that said accumulated number of times of execution and said first time are classified based on said indicator indicating said process wake-up process; and
   said output unit being configured to output a first result including said accumulated number of times of execution and said first time.

2. The IT system behavior measurement and analysis system according to claim 1, wherein said analysis unit accumulates, based on said process sleep process included in said trace data, said process wake-up process that wakes up a process brought into a sleep state by said process sleep process, and said event occurrence time, said number of times and a second time as a time from said process sleep event to said process wake-up event or to said process resume event with respect to said plurality of processes such that said number of times and said second time are classified based on information indicating said process wake-up process, and
    said output unit outputs a second analysis result including said number of times and said second time.

3. The IT system behavior measurement and analysis system according to claim 1, wherein said wake-up event data further includes information indicating a wake-up object process serving as a wake-up object.

4. The IT system behavior measurement and analysis system according to claim 1, further comprising a measuring object system, wherein said measuring object system includes said event tracer and said trace buffer.

5. The IT system behavior measurement and analysis system according to claim 1, further comprising a data analysis system, wherein said data analysis system includes said analysis unit and said output unit.

6. An IT system behavior measurement and analysis method comprising:
    generating event data when an event occurs, including sleep event data when said event is a process sleep event, wake-up event data when said event is a wake-up event, save event data when said event is a save event, and resume event data when said event is a resume event, wherein said generated event data includes information indicating an event type of said event, an indicator of a process involved in said event, and an event occurrence time of said event;
    recording said generated event data in a trace buffer;
    with respect to a plurality of processes to be executed:
        accumulating a number of times of execution of a given process wake-up with respect to a given process save process, and
        determining a first time as a time difference between (1) said event occurrence time of a given process save event to said event occurrence time of one of: (2a) a related instance of said process wake-up event and (2b) a related instance of said process resume event;
    classifying said number of times of execution and said first time based on information indicating said process wake-up process; and
    outputting a first result including said number of times and said first time.

7. The IT system behavior measurement and analysis method according to claim 6, wherein said accumulating includes a step of accumulating, based on said process sleep process included in said trace data, said process wake-up process that wakes up a process brought into a sleep state by said process sleep process, and said event occurrence time, said number of times and a second time as a time from said process sleep event to said process wake-up event or to said process resume event with respect to said plurality of processes such that said number of times and said second time are classified based on information indicating said process wake-up process, and
    said outputting includes a step of outputting a second analysis result including said number of times and said second time.

8. The IT system behavior measurement and analysis method according to claim 6, wherein said wake-up event data further includes information indicating a wake-up object process serving as a wake-up object.

9. The IT system behavior measurement and analysis method according to claim 6, further comprising a data measurement method, wherein said data measurement method including
    said respectively generating and
    said recording.

10. The IT system behavior measurement and analysis method according to claim 6, further comprising a data analysis method, wherein said data analysis method includes
    said accumulating; and
    said outputting.

11. A non-transitory recording medium which records a computer program that is readable to a computer and causes said computer to execute a method including:
    generating event data when an event occurs, including sleep event data when said event is a process sleep event, wake-up event data when said event is a wake-up event, save event data when said event is a save event, and resume event data when said event is a resume event, wherein said generated event data includes information indicating an event type of said event, an indicator of a process involved in said event, and an event occurrence time of said event;
    recording said generated event data in a trace buffer;
    with respect to a plurality of processes to be executed:
        accumulating a number of times of execution of a given process wake-up with respect to a given process save process, and
        determining a first time as a time difference between (1) said event occurrence time of a given process save event to said event occurrence time of one of: (2a) a related instance of said process wake-up event and (2b) a related instance of said process resume event;
    classifying said number of times of execution and said first time based on information indicating said process wake-up process; and
    outputting a first result including said number of times and said first time.

12. The non-transitory recording medium according to claim 11, wherein said accumulating includes a step of accumulating, based on said process sleep process included in said trace data, said process wake-up process that wakes up a process brought into a sleep state by said process sleep process, and said event occurrence time, said number of times and a second time as a time from said process sleep event to said process wake-up event or to said process resume event with respect to said plurality of processes such that said number of times and said second time are classified based on information indicating said process wake-up process, and
    said outputting includes a step of outputting a second analysis result including said number of times and said second time.

13. The non-transitory recording medium according to claim 11, wherein said wake-up event data further includes information indicating a wake-up object process serving as a wake-up object.

14. A non-transitory recording medium which records a computer program that is readable to a computer and causes said computer to execute a method according to claim 11, which records a measurement computer program that is readable to a measuring object system serving as said computer and causes said measuring object system to execute:
    said respectively generating; and
    said recording.

15. A non-transitory recording medium which records a computer program that is readable to a computer and causes said computer to execute a method according to claim 11, which records an analysis computer program that is readable to a data analysis system serving as said computer and causes said data analysis system to execute:
    said accumulating; and
    said outputting.

* * * * *